United States Patent [19]

Volk et al.

[11] Patent Number: 4,575,120
[45] Date of Patent: Mar. 11, 1986

[54] DISPLACEMENT ENTRAINMENT AND UNLOCKING MEMBERS FOR A PASSIVE SAFETY BELT

[75] Inventors: Hans-Joachim Volk, Ebersdorf; Herbert Becker; Michael Forkel, both of Coburg, all of Fed. Rep. of Germany

[73] Assignee: Brose Fahrzeugteile GmbH & Co. KG, Fed. Rep. of Germany

[21] Appl. No.: 607,286

[22] Filed: May 4, 1984

[30] Foreign Application Priority Data

May 5, 1983 [DE] Fed. Rep. of Germany ....... 3316457

[51] Int. Cl.[4] .............................................. B60R 21/10
[52] U.S. Cl. ..................................... 280/804; 297/469
[58] Field of Search ...................... 280/802, 803, 804; 297/469

[56] References Cited

U.S. PATENT DOCUMENTS

| | | | |
|---|---|---|---|
| 4,354,696 | 10/1982 | Volk et al. | 280/804 |
| 4,369,990 | 1/1983 | Takada | 280/804 |
| 4,400,014 | 8/1983 | Takada | 280/804 |

FOREIGN PATENT DOCUMENTS

| | | |
|---|---|---|
| 2951881 | 7/1981 | Fed. Rep. of Germany . |
| 3046371 | 7/1982 | Fed. Rep. of Germany . |
| 3150245 | 9/1983 | Fed. Rep. of Germany . |

Primary Examiner—Richard A. Bertsch
Attorney, Agent, or Firm—Craig & Burns

[57] ABSTRACT

An installation in a passive safety belt actuating mechanism for the displacement of an entrainment member for a safety belt and of an unlocking element for unlocking the entrainment member from a locking mechanism, along a guide profile by means of an elongated flexible member extending in a guide profile, on which the entrainment member is secured for limited longitudinal displacement while the unlocking element is non-displaceably secured thereon; the elongated flexible member consists of a cable rigid in tension and compression with a plastic sleeve which is removed in the longitudinal displacement section of the entrainment member and in a fastening area of the unlocking element adjoining the same.

20 Claims, 6 Drawing Figures

DISPLACEMENT ENTRAINMENT AND UNLOCKING MEMBERS FOR A PASSIVE SAFETY BELT

The present invention relates to an arrangement in a passive safety belt actuating installation for the displacement of an entrainment member for a safety belt along a guide profile by means of an elongated, flexible member extending in the guide profile, in which the entrainment member is longitudinally displaceable on the flexible member within limits, and in which the elongated flexible member consists of a cable unyielding in compression and tension and covered with a plastic material sleeve which is removed within the longitudinal displacement area of the entrainment member.

Such an installation is disclosed already in the U.S. Pat. No. 4,354,696. In this prior art installation the elongated flexible member consists of an apertured band on which the entrainment member and the unlocking element are mounted by means of screws.

It is the object of the present invention to be able to realize such an installation by simple means and to be able to manufacture the same in a simple manner. The underlying problems are solved according to the present invention in that an unlocking element for unlocking the entrainment member from a locking mechanism is non-displaceably secured within an area of the tension and compression rigid cable freed from the plastic sleeve, which adjoins the longitudinal displacement section of the entrainment member.

Tension and compression rigid cables surrounded by a plastic sleeve are commercially available or can be manufactured without difficulties. Moreover, it involves no difficulties to remove the plastic sleeve in such cables sectionwise.

A particularly simple fastening of the unlocking element which in principle can be realized by known means, with an unlocking element fitted without considerable expenditures, resides in that the unlocking element includes two sleeve shaped slide members spaced at a distance from one another, surrounding the cable and matched to the guide profile, between which is arranged a pinch-nipple pressed about the cable, whose width corresponds to the spacing of the slide members.

According to another feature of the present invention, the longitudinal displacement area of the entrainment member is limited by one of the slide members and by a second pinch-nipple pressed about the cable—possibly by interposition of a spacer bushing.

In order to be able to guide the free end of the cable in the guide profile and to be able to actuate a switch by means of the free end, according to still another feature of the present invention, a sleeve with a head portion matched to the guide profile is secured at the free end of the cable.

According to still a further feature of the present invention, the entrainment member includes two sleeve-shaped slide members surrounding the cable at a distance from one another and matched to the guide profile in order to be able to guide within the guide profile without friction not only the unlocking element but also the entrainment member.

A particularly advantageous construction according to the present invention resides in that all of the sleeve-shaped slide members have a barrel-shaped contour.

These and other objects, features and advantages of the present invention will become more apparent from the following description when taken in connection with the accompanying drawing which shows, for purposes of illustration only, several embodiments in accordance with the present invention, and wherein.

Figure 1:
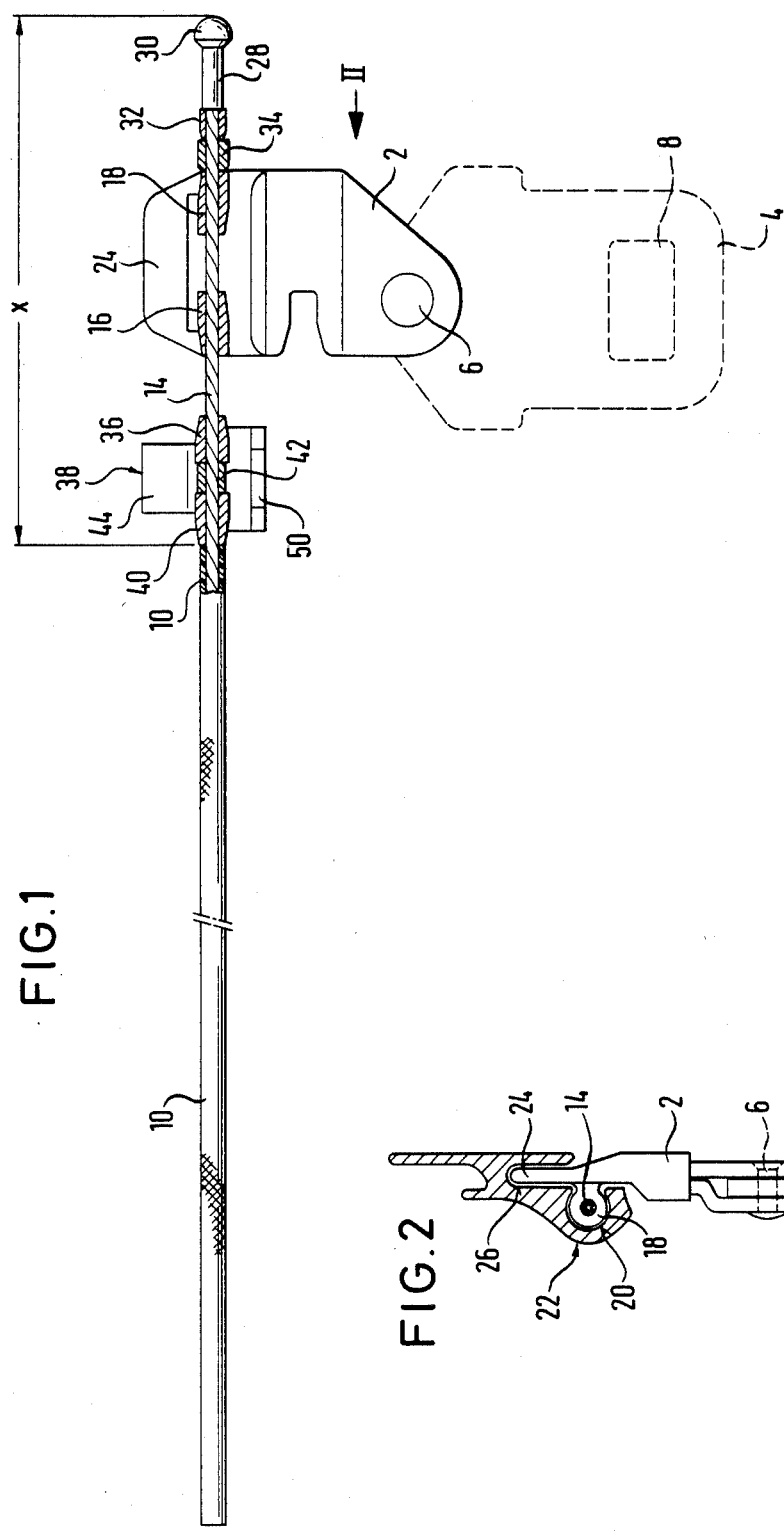
FIG. 1 is a side elevational view of an installation in accordance with the present invention, in which some of the parts are shown in cross section.
Figure 2:
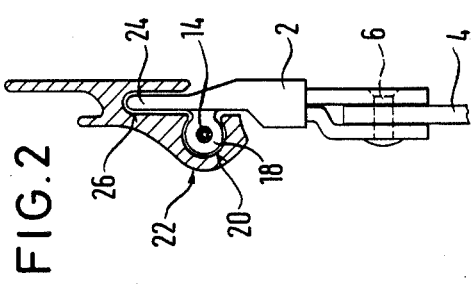
FIG. 2 is a transverse cross sectional view through the installation taken in the direction of arrow II of FIG. 1 and showing the parts within a guide profile.

Referring now to the drawing wherein like reference numerals are used throughout the various views to designate like parts, and more particularly to FIGS. 1 and 2, the installation in accordance with the present invention includes an entrainment or force transmission member 2 for a safety belt. The safety belt is pivotally connected at a pivotal connecting place 6 of the entrainment member 2 by way of an end member 4 mounted on the safety belt. The end member 4 includes an eyelet 8 through which extends the safety belt. The entrainment member 2 is displaceably mounted within certain limits on a section x of a tension and compression rigid cable 14, whereby the plastic sleeve 10 is removed within the section x. For that purpose, two slide members 16 and 18 which surround the cable 14 and are spaced from one another at a distance, are arranged at the entrainment member 2. The outer contour of these slide members 16 and 18 is matched to a guide channel generally designated by reference numeral 20 (FIG. 2) within a guide profile generally designated by reference numeral 22 for the entrainment member 2. In order that the entrainment member 2 cannot tilt about the cable 14, it includes a tongue 24 (FIG. 2) which engages in a longitudinal groove 26 of the guide profile 22. The displaceability of the entrainment member 2 toward the free end of the cable 14 is limited by a sleeve 28 having a head portion 30, which is mounted over the free end of the cable 14. The head portion 30 is again matched to the guide channel 20 within the guide profile 22. A switch (not shown) serving as limit switch to turn off the driving motor can be actuated by means of a head portion 30. At any rate, the head portion 30 serves the purpose of guiding the end of the cable 14 within the guide channel 20 and prevents a fanning out or unsplicing of the end of the cable 14. A pinch-nipple 32 attached to the sleeve 28 serves for the fastening thereof; the pinch-nipple 32 thereby surrounds the cable 14. A spacer bushing 34 which forms the abutment for the entrainment member 2, is disposed between the pinch-nipple 32 and the entrainment member 2.

The displaceability of the entrainment member 2 in the direction away from the free end of the cable 14 is limited by a slide member 36 at an unlocking element generally designated by reference numeral 38 and seated on the cable 14. The unlocking element 38 includes a further slide member 40 at a distance from the slide member 36, which butts the plastic sleeve 10 of the cable 14. The outer contour of the slide members 36 and 40 is also matched to the guide channel 20 in the guide profile 22. A pinch-nipple 42 is disposed between the slide members 36 and 40, which surrounds the cable 14 and is matched to the spacing of the slide members 36 and 40. As a result thereof, the unlocking member 38 is mounted on the cable 14 safe against displacement. (In principle it is also possible to arrange the pinch-nipple 42 outside of the unlocking element 38—namely, to the left of the unlocking element 38 in FIG. 1.) In order to prevent the unlocking element 38 from tilting about the cable 14, it includes a tongue 44 which corresponds to the tongue 24 and is also guided in the groove 26 of the guide profile 22.

The slide members 16, 18, 36 and 40 are sleeve shaped and have a barrel-shaped contour.

Figure 3:
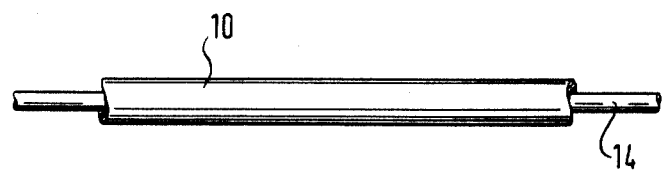
FIG. 3 is a side elevational view of a cable in accordance with the present invention with the plastic sleeve partially removed.
Figure 4:
FIGS. 4–6 are transverse cross sectional views through various different embodiments of a cable with a plastic sleeve in accordance with the present invention.

FIG. 3 illustrates on an enlarged scale the cable 14 with the plastic sleeve 10 surrounding the same. A cross section thereof is illustrated in FIG. 4. In this case, the cable consists of steel and is solid.

Figure 5:
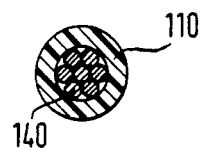

In a cross section corresponding to that of FIG. 4 through a modified embodiment according to the present invention, the cable 140 according to FIG. 5, consists of a stranded cable which is surrounded by a plastic sleeve 110.

Figure 6:
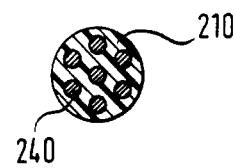

In a third embodiment according to FIG. 6, the cable 240 consists of several snaked stranded wires which are surrounded by a plastic sleeve 210 and are embedded in the plastic material of this plastic sleeve 210.

OPERATION

The operation of the installation in accordance with the present invention is essentially described in the U.S. Pat. No. 4,354,696. Entrainment members 2 and unlocking elements 38 of the instant disclosure corresponds to retention member 60 and release member 34 of said U.S. Pat. No. 4,354,696, and operates to actuate and hold the seat belt stationary in the manner taught by said U.S. Pat. No. 4,354,696. Unlocking element 38 and then entrainment member 2 are moved into the locking mechanism wherein a cam surface on member 2 cams a corresponding cam surface and nosed locking latch to open the latch and permit the member to pass by the nose portion thereof. After passage by the nose portion, the latch is free to pivot back under action of a spring to engage the member 2 in a locked position. To unlock the seat belt, cable 14 is shifted toward the right as shown in FIG. 1, causing unlocking element 38 to move to the right and cam open the nose-shaped locking latch via the expedient of unlocking extension 50 camming second cam surface on the latch. During the initial movement of unlocking element 38 to the right (e.g., 7.5 mm), entrainment member 2 is held stationary by the nosed latch until the unlocking extension 50 on element 38 cams open the nose-shaped latch from engagement with the entrainment member 2. During this initial movement, cable 14 moves freely through slide members 16 and 18 until the nosed latch is opened and member 2 is released. The unlocking element 38 then encounters the entrainment member 2 and displaces the same in the guide profile 22 to its other end position.

The described construction is additionally characterized by the fact that it is very flat (has a low structural height) and in that the displacement operation of the unlocking element does not take place alongside the displacement means (the apertured band according to U.S. Pat. No. 4,354,696) but directly about the cable 14. Therebeyond, the entrainment member and the unlocking element are constructed in a very simple manner and can be installed on the cable in a very simple manner.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An arrangement in a passive safety belt actuating installation for the displacement of an entrainment means for a safety belt along a guide profile means, comprising a lengthwise groove in the guide profile means and an elongated flexible member extending in the guide profile means, said entrainment means being secured on said flexible member longitudinally displaceably within limits and having a tongue means engaging the lengthwise groove in the guide profile means, the flexible member consisting of a cable means substantially non-yielding in tension and compression and having a plastic sleeve which is removed within the longitudinal displacement area of the entrainment means, and an unlocking means for unlocking the entrainment means from a locking mechanism, said unlocking means being non-displaceably secured on said cable means within an area of said cable means adjoining the longitudinal displacement area of the entrainment means and having a tongue means engaging the lengthwise groove in the guide profile means, and the plastic sleeve being removed also from the cable means within said adjoining area.

2. An arrangement according to claim 1, wherein the unlocking means includes two mutually spaced sleeve-shaped slide members surrounding the cable means at a distance from one another and matched to the guide profile means, and a pinch-nipple between said slide members pressed about the cable means, the width of said pinch-nipple corresponding substantially to the spacing of the slide members.

3. An arrangement according to claim 2, wherein the longitudinal displacement area of the entrainment means is limited by one of the slide members and by a second pinch-nipple pressed about the cable.

4. An arrangement according to claim 3, wherein a spacer bush is interposed between said one slide member and the second-mentioned pinch-nipple.

5. An arrangement according to claim 3, wherein a bushing having a head portion matched to the guide profile means is secured at the free end of the cable means.

6. An arrangement according to claim 5, wherein the entrainment means includes two sleeve shaped slide members surrounding the cable means at a distance from one another and matched to the guide profile means.

7. An arrangement according to claim 6, wherein the sleeve-shaped slide members have a barrel shaped contour.

8. An arrangement according to claim 6, wherein the cable means consists of steel.

9. An arrangement according to claim 8, wherein the cable means is solid.

10. An arrangement according to claim 8, wherein the cable means is in the form of a stranded wire.

11. An arrangement according to claim 10, wherein the cable means is in the form of several stranded wires.

12. An arrangement according to claim 11, wherein said stranded wires are twisted.

13. An arrangement according to claim 8, wherein the plastic sleeve is extruded onto the cable.

14. An arrangement according to claim 1, wherein the entrainment means includes two sleeve shaped slide members surrounding the cable means at a distance from one another and matched to the guide profile means.

15. An arrangement according to claim 14, wherein the unlocking means includes two mutually spaced sleeve-shaped slide members surrounding the cable means at a distance from one another and matched to the guide profile means, and a pinch-nipple between said slide members pressed about the cable means, the width of said pinch-nipple corresponding substantially to the spacing of the slide members.

16. An arrangement according to claim 15, wherein the sleeve-shaped slide members have a barrel shaped contour.

17. An arrangement according to claim 1, wherein the cable means is solid.

18. An arrangement according to claim 1, wherein the cable means is in the form of a stranded wire.

19. An arrangement according to claim 1, wherein a bushing having a head portion matched to the guide profile means is secured at the free end of the cable means.

20. An arrangement according to claim 1, wherein the plastic sleeve is extruded onto the cable.

* * * * *